United States Patent
McNeil et al.

(10) Patent No.: US 8,510,808 B2
(45) Date of Patent: Aug. 13, 2013

(54) ASSOCIATING COMPUTING DEVICES WITH COMMON CREDENTIALS

(75) Inventors: Brian L. McNeil, Kirkland, WA (US); Michael G. Sheldon, Seattle, WA (US); Steve Seixeiro, Snohomish, WA (US); Ramkumar Ramasubramanian, Bellevue, WA (US); Jerry K. Koh, Redmond, WA (US); Anshul Rawat, Kirkland, WA (US); Andrew V. Davidson, Kirkland, WA (US); Daniel Oliver, Seattle, WA (US); Michael D. McCormack, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1226 days.

(21) Appl. No.: 11/971,028

(22) Filed: Jan. 8, 2008

(65) Prior Publication Data
US 2009/0178122 A1    Jul. 9, 2009

(51) Int. Cl.
*G06F 15/16*    (2006.01)

(52) U.S. Cl.
USPC ............ 726/5; 709/201; 709/202; 709/203; 709/206; 709/223; 709/224; 709/225; 709/226; 726/2; 726/3; 726/4; 726/11; 726/12; 718/100

(58) Field of Classification Search
USPC ............ 726/2–5, 11–12; 709/206, 223–226; 709/201–203; 370/352, 356; 718/100
See application file for complete search history.

(56) References Cited

U.S. PATENT DOCUMENTS

| | | | |
|---|---|---|---|
| 6,421,768 B1 | 7/2002 | Purpura | |
| 7,085,925 B2 | 8/2006 | Hanna | |
| 7,130,621 B2 | 10/2006 | Biawat | |
| 7,206,841 B2 | 4/2007 | Traversat | |
| 7,206,934 B2 | 4/2007 | Pabla | |
| 7,450,567 B1 * | 11/2008 | Mamnani | 370/352 |
| 7,689,700 B2 | 3/2010 | McNeil et al. | |
| 2002/0147810 A1 | 10/2002 | Traversat et al. | |
| 2003/0055892 A1 | 3/2003 | Huitema | |
| 2003/0056093 A1 | 3/2003 | Huitema | |
| 2003/0110073 A1 * | 6/2003 | Briel et al. | 705/10 |
| 2003/0163697 A1 | 8/2003 | Pabla et al. | |
| 2003/0204734 A1 | 10/2003 | Wheeler | |
| 2004/0054714 A1 * | 3/2004 | Wuerfel et al. | 709/203 |
| 2004/0064511 A1 | 4/2004 | Abdel-Aziz et al. | |
| 2004/0064512 A1 | 4/2004 | Arora et al. | |

(Continued)

OTHER PUBLICATIONS

International Search Report, PCT/US2008/086664, Mailing Date Jun. 24, 2009, Korean Intellectual Property Office.

(Continued)

*Primary Examiner* — Thanhnga B Truong
(74) *Attorney, Agent, or Firm* — Merchant & Gould P.C.

(57) ABSTRACT

Method and computer storage media for sharing resources between a plurality of computing devices associated with a common non-enterprise network. A common set of credentials is stored on at least two or more of a plurality of computing devices that reside behind a routing device and are associated through a common non-enterprise network. Upon storing the common set of credentials, each of the two or more of a plurality of computing devices create a local account that contains, at least, the common set of credentials. The common set of credentials allow for the sharing, among the two or more of the plurality of computing devices, of resource that reside on or are associated with the computing devices.

20 Claims, 5 Drawing Sheets

(56) References Cited

U.S. PATENT DOCUMENTS

| | | | |
|---|---|---|---|
| 2004/0111645 A1 | 6/2004 | Baffes | |
| 2004/0148333 A1 | 7/2004 | Manion | |
| 2004/0210767 A1 | 10/2004 | Sinclair | |
| 2005/0086300 A1 | 4/2005 | Yeager et al. | |
| 2005/0091654 A1* | 4/2005 | Lection et al. | 718/100 |
| 2006/0059341 A1 | 3/2006 | Dharmadhikari | |
| 2006/0155802 A1 | 7/2006 | He | |
| 2006/0156390 A1 | 7/2006 | Baugher | |
| 2006/0224890 A1 | 10/2006 | Zhou | |
| 2007/0101400 A1* | 5/2007 | Freeman et al. | 726/2 |
| 2007/0162963 A1 | 7/2007 | Penet | |
| 2007/0174410 A1 | 7/2007 | Croft | |
| 2007/0223398 A1 | 9/2007 | Luo et al. | |

OTHER PUBLICATIONS

Office Action, U.S. Appl. No. 11/971,020 mailed Aug. 17, 2009.
Bruno, Richard et al., "Clique: A transparent, Peer-to-Peer Collaborative File Sharing System," Oct. 28, 2002, http://66.102.1.104/scholar?hl=en&lr=&q=cacheTqlFOULYEosJ:www.hwswworld.com/downloads/9_13_05_a_pdfs/HPL-2002-307.pdf, HP Laboratories, France.
Emir Halepovic, "Performance Evaluation and Benchmarking the JXTA Peer-to-Peer Platform," Aug. 2004, http://64.233.183.104/search?q=cache:th7YeEm7j-IJ:library2.usask.ca/theses/submitted/etd-08132004-120924/unrestricted/Halepovic-JXTA.pdf, University of Sakatchewan.
How to enable Single Sign-on for my Terminal Server Connections, http://blogs.msdn.com/ts/archive/2007/04/19/how-to-enable-single-sign-on-for-my-terminal-server-connections.aspx.
Connecting to the Internet Securely; Protecting Home Networks, http://www.ciac.org/ciac/documents/CIAC-2324_Connecting_to_the_Internet_Securely_Protecting_Home_Networks.pdf.
U.S. Appl. No. 11/971,020, Amendment filed Nov. 17, 2009, 12 pages.
U.S. Appl. No. 11/971,020, Notice of Allowance mailed Dec. 31, 2009, 9 pages.
Chinese First Office Action in Application 200880124569.1 mailed Nov. 24, 2011, 11 pages.
Chinese Notice of Allowance in Application 200880124569.1 mailed Aug. 23, 2012, 4 pages.
P2P Computing, retrieved from http://64.233.183.104/search?q=cache:YbgE2r_jwBgJ:www.srdc.metu.edu.tr/webpage/seminars/p2p/P2P.ppt, [retrieved on Oct. 18, 2007], (26 pages).
Fredrik Espinoza, Lucas Hinz, "Generic Peer-to-Peer Support for a Personal Service Platform," retrieved from http://64.233.183.104/search?q=cache:KDsStkX_-xwJ:www.sics.se/~espinoza/documents/saint2003.pdf, Swedish Institute of Computer Science, Kista, Sweden, [retrieved on Oct. 18, 2007], (12 pages).
Microsoft Windows XP Professional, retrieved from http://www.dtrbus.com/libr/ms-xpadv.pdf, Aug. 2001, (6 pages).
Enterprise Single Sign on Solutions, retrieved from http://www.actividentity.com/solutions/technology/esso_overview.php, [retrieved on Oct. 19, 2007], (2 pages).

* cited by examiner

ASSOCIATING COMPUTING DEVICES WITH COMMON CREDENTIALS

BACKGROUND

The sharing of resource among a plurality of computing devices allows for a resource associated with a particular computing device to be accessed and utilized by a second computing device. Traditionally, in order for computing devices to share a resource in an enterprise network, the process requires credentials to be associated with one or more of the particular users of the plurality of computing devices to allow for the sharing of resources that are associated with the computing devices. The credentials that allow for sharing of resource are associated with a particular user instead of a particular computing device. This is difficult and problematic with a non-enterprise computer network. By associating the credentials with a user instead of a computing device, the computing device can only share a resource if the current user has the proper credentials to allow sharing.

SUMMARY

Embodiments of the present invention relate to systems and methods for a non-enterprise network. An embodiment of the present invention allows for the sharing of resources among a plurality of computing devices associated with a common non-enterprise network by providing a common set of credentials to each of the computing devices that belong to a common resource sharing group. The common set of credentials of an embodiment of the present invention are associated with the computing device rather than a particular user's profile.

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWING

Embodiments are described in detail below with reference to the attached drawing figures, wherein.

DETAILED DESCRIPTION

Figure 1:
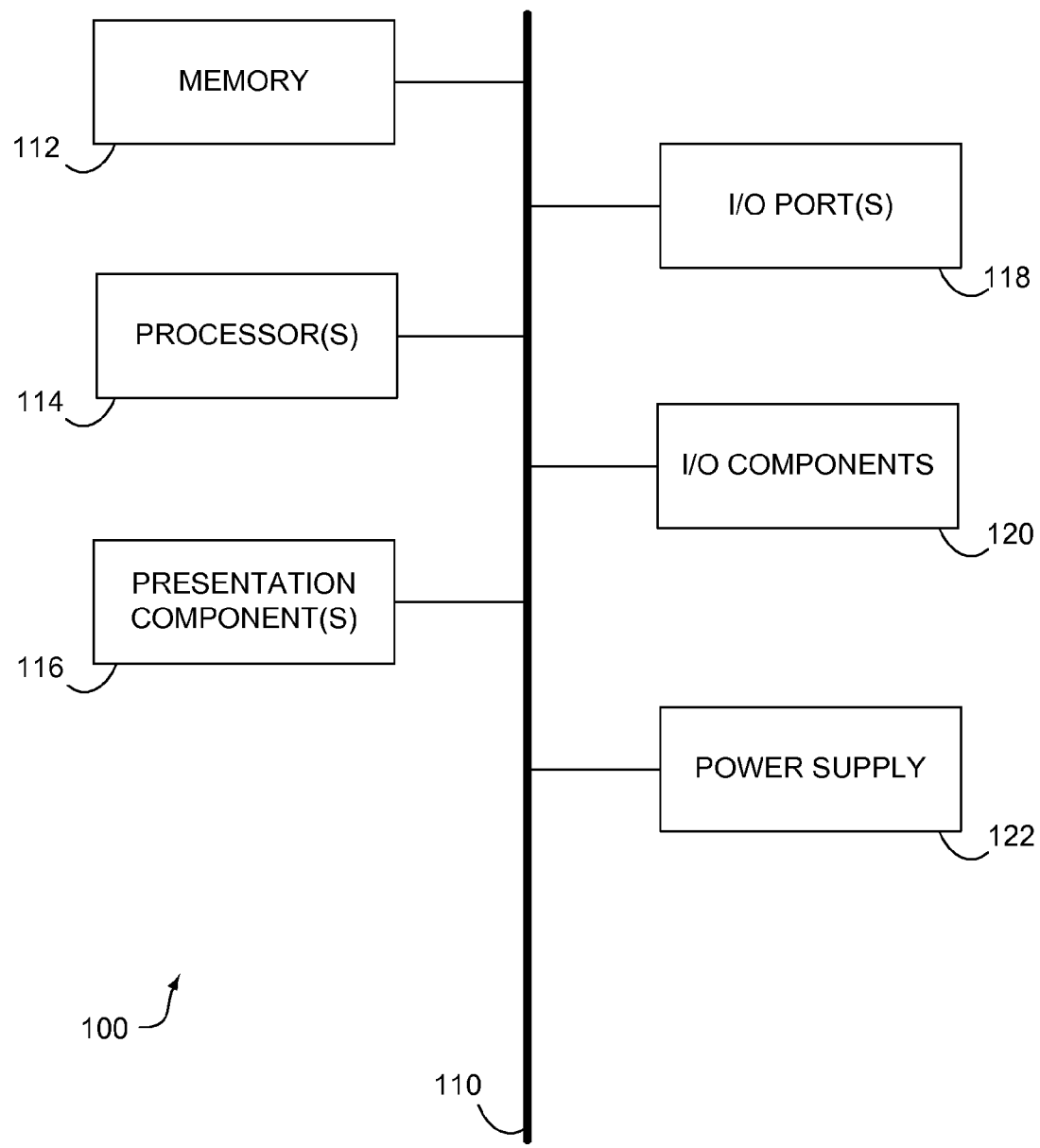
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to a non-enterprise computer network system comprised of two or more computing devices that are connected to a non-enterprise computing network wherein the computing devices reside behind a routing device. The non-enterprise computing network is additionally comprised of a common set of credentials that are stored on at least two of the plurality of computing devices residing behind the routing device. The common set of credentials allows for the sharing of one or more resources residing on or associated with the at least two of the plurality of computing devices that have stored the common set of credentials.

Accordingly, in one aspect, the present invention provides a computer storage media having computer executable instructions embodied thereon that, when executed, perform a method for sharing resources between a plurality of computing devices associated with a common non-enterprise network. The method includes storing a common set of credentials on two or more of the plurality of computing devices that are associated with the common non-enterprise computing network. The method additionally includes requesting access to one or more resources, wherein the one or more resources reside on or are associated with the computing devices that have stored the common set of credentials The method also provides for the accessing of the one or more resources utilizing the common set of credentials.

In another aspect, the present invention provides a computer storage media having computer executable instructions embodied thereon that, when executed, perform a method for sharing resources between a plurality of computing devices associated with a common non-enterprise network that does not contain a central server. The method provides for the storing of a common set of credentials on two or more of the plurality of computing devices associated with the common non-enterprise network. The method further includes grouping the two or more computing devices as a homegroup wherein the computing devices utilize a peer-to-peer communication model; creating a local account on each of the two or more of the plurality of computing devices of the homegroup, wherein the local account contains the stored common set of credentials; sharing access to one or more resources, wherein the one or more resources reside on or are associated with at least one of the computing devices within the homegroup, further wherein the one or more resources is comprised of a printer and a computer readable media; and accessing the one or more resources utilizing the common set of credentials, wherein the access to the one or more resources is independent of a user entered username and/or password.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, 1/0 modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an 1/0 module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
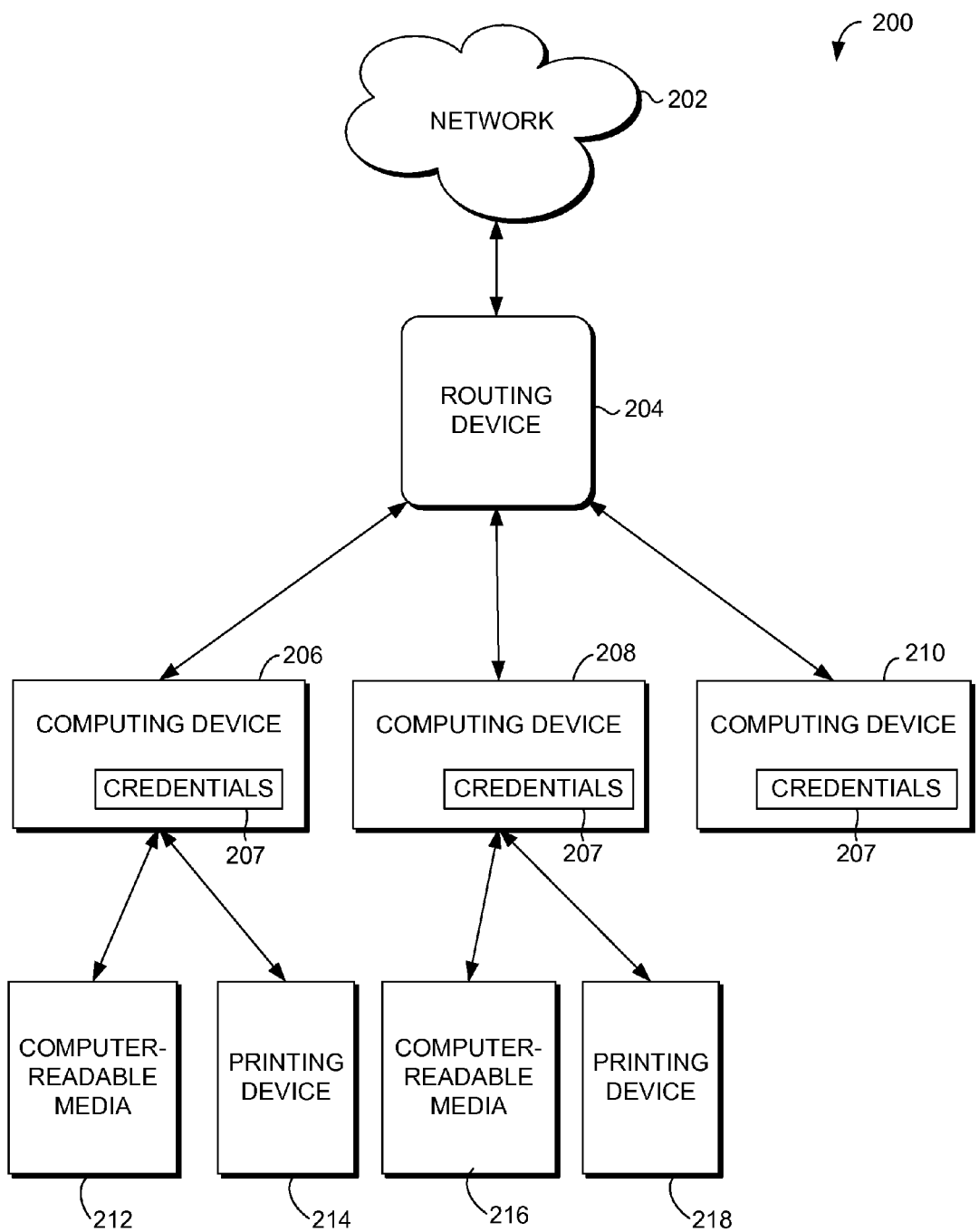
FIG. 2 is a block diagram of an exemplary non-enterprise computer network system configured for use in implementing embodiments of the present invention.

With reference to FIG. 2, a block diagram is illustrated that shows an exemplary non-enterprise computer network system 200 configured for use in implementing embodiments of the present invention. It will be understood and appreciated by those skilled in the art that the non-enterprise computer network system 200 shown in FIG. 2 is merely an example of one suitable non-enterprise computer network system and is not intended to suggest any limitation as to the scope of use or functionality of the present invention. The non-enterprise computer network system 200 should not be interpreted as having any dependency or requirement related to any single module/component or combination of modules/components illustrated therein. An enterprise network traditionally includes a computing network that connects multiple computing devices across multiple subnetworks with a central server. The enterprise network has many users and each of the users of the enterprise network are assigned a unique identification. The enterprise network's central server utilizes the unique identification to determine permissions assigned to that user.

The non-enterprise computer network system 200 includes a network 202, a routing device 204, a plurality of computing devices 206, 208, and 210, multiple resources such as computer readable media 212 and 216, as well as printing devices 214 and 218. The network 202 may include, without limitation, one or more local area networks (LANs) and/or wide area networks (WANs). Such networking environments are commonplace in offices, residential networks, intranets, and the Internet. Accordingly, the network 202 is not further described herein.

Routing device 204 provides a connecting device between computing devices 206, 208, and 210. Routing device 204 allows for wired or wireless connections between the computing devices 206, 208, and 210. Typically, the routing device 204 of a non-enterprise computer network serves as a residential gateway which provides port translations to allow multiple computing devices to share one IP address and Internet connection. Routing device 204 may sit between the modem and the internal network, but routing device 204 may also be integrated into a modem connected to network 202 or a higher level of network 202. In the present embodiment, routing device 204 combines the functions of port translator, a multi-port Ethernet switch, and a WiFi access point. In alternative embodiments, routing device 204 is any combination of a switch, hub, wireless access point, or a dynamic host configuration protocol computing device. Routing device 204 provides a border between subnetworks. A subnetwork is a range of logical addresses within the address space assigned to an organization. Therefore in the current embodiment, routing device 204 has been assigned an address space, and routing device 204 provides logical addresses to computing devices 206, 208, and 210 associated with routing device 204.

With reference to computing device 206, computing device 208, and computing device 210 as shown in FIG. 2 may be any type of computing device, such as, for example, computing device 100 discussed above with reference to FIG. 1. By way of example only and not limitation, computing devices 206, 208, and 210 includes personal computers, desktop computers, laptop computers, handheld device, mobile handset, consumer electronic device, networked computer peripherals, and the like. In an embodiment of the present invention, computing devices 206, 208, and 210 are connected to the routing device 204 through wired or wireless connections. The combination of the computing devices 206, 208, and 210 in addition to the routing device 204 create a non-enterprise computer network that allows for the communication of the associated devices amongst and between one another. The non-enterprise network is limited to a subnetwork defined by the routing device 204.

A non-enterprise computer network is a local area network that connects multiple computing devices. A simple embodiment of a non-enterprise computer network connects two or more computing devices to share files, printers, and a single Internet connection. Typically, a non-enterprise computer network does not contain a central server. Instead, a non-enterprise computer network utilizes a peer-to-peer communication model. The peer-to-peer communication model eliminates the need for a central entity, such as a server, that is responsible for controlling access and communications between the computing devices connected to the computing network. Peer-to-peer communication model typically connect nodes by ad-hoc connections where there is not a notion of clients and servers, but instead, the nodes are equal peer nodes that can function as both clients and servers to the other nodes of the network. The peer-to-peer communication model allows for permissions, authentication, and/or verifications to be handled by the particular computing devices connected to the network. A non-enterprise computer network is typically limited to no more than two hundred and fifty-four computing devices within one subnetwork. The non-enterprise computer network is used primarily in residential, small to medium sized professional applications and other networking environments that do not require a central server or central authority that all computing devices connect to for permissions, authentication, and/or verifications.

Returning to computing devices 206, 208, and 210 of FIG. 2. In the current embodiment each of the computing devices 206, 208, and 210 contain one of a set of common credentials 207. A credential is an object that is verified when presented to the verifier in an authentication transaction. Credentials in an electronic form can be digital documents used in authentication and access control that binds an identity or attribute to a claimant's token or some other property, such as a current network address. The common set of credentials 207 are associated with each particular computing device as opposed to a particular user of that computing device. The commons set of credentials are provided to the computing devices in a variety of ways that includes, but are not limited to, a submission of the credentials to the computing device via a network, a computer readable storage media, a user entered combination, a radio frequency, an infrared transmission, or other mechanisms known in the art for providing information such as credentials to a computing device. Additionally, the credentials may only be provided to a computing device after the computing device has provided a valid passkey to allow the credentials to be stored to the computing device. The common set of credentials 207 allow the resources of computing devices 206, 208, and 210 to be shared and accessed by all computing devices on the subnetwork that also contain the common set of credentials.

In an alternative embodiment of the invention, the common set of credentials will be stored on each of the computing devices in a local account. The local account may also contain credentials other than the common set of credentials. The local account that maintains the common set of credentials on each of the computing devices allows the computing device to maintain an association with the other computing devices located on the network that also contain the common set of credentials regardless of the particular user utilizing the computing device. Stated another way, the common set of credentials allows the sharing of resource between computing devices regardless of the particular user of the computing device.

In an alternative embodiment, before a local account is created on a computing device, the computing device will check to verify if a common set of credentials have been stored that would allow for the associating of multiple computing devices on the network. In one embodiment, the group of computing devices that all contain the common set of credentials are a homegroup. Typically homegroups are restricted to computing devices that all reside behind a routing device, and therefore on the same subnetwork. The common set of credentials is a single set of credentials that are commonly located on each of the computing devices associated with a particular homegroup.

Computing device 206 is associated with a readable media 212 and a printing device 214 as resources. Computing device 208 contains the resources of a computer readable media 216 and a printing device 218. Computer readable media 212 and 216 includes the types of computer-readable media discussed in connection with computing device 100 in FIG. 1. Computing device 100 typically includes a variety of computer-readable media. By way of example, and not limitation, computer-readable media may comprise storage media, Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices.

Printing devices 214 and 218 produce a hard copy of a document stored in electronic form, usually on a physical media such as paper. Printing devices typically include toner-based printers, liquid inkjet printers, sold ink printers, dye-sublimation printers, inkless printers, dot-matrix printers, line printers, pen based plotters, and thermal printers.

Computer readable media 212 and 216 and printing devices 214 and 218 are exemplary embodiment of the resources that may reside on or be associated with a computing device. It will be understood and appreciated to one skilled in the art that the resources represented with the non-enterprise computer network 200 are not limiting on the invention. The invention may incorporate other or additional resources to be accessed and shared. Additional resources include, but are not limited to, facsimile devices, copy devices, scanning devices, presentation devices, display devices, computer storage media, DVD devices, CD devices, optical storage devices, hard disk drive devices, audio input devices, audio output devices, connectivity devices, and gaming devices.

In an exemplary embodiment, the resources available to the computing devices of a homegroup are not limited to resources that have been explicitly selected as being accessible, instead, the various resources of the home group are accessible without having to be specifically identified as such. But, one or more resources in this exemplary embodiment could also be explicitly selected as non-sharable to other computing devices of the homegroup. Stated in the alternative, resources of a computing device are, by default, accessible to other computing devices of a homegroup unless explicitly indicated to the contrary.

In an exemplary embodiment of a non-enterprise computer network system routing device 204 connects computing devices 206, 208, and 210 to create a homegroup. Each of the computing devices 206, 208, and 210 contains a common set of credentials 207 that allow sharing of the resources associated with each of the computing devices 206 and 208. The resources are computer readable media 212 and 216 as well as printing device 214 and 218. In this exemplary embodiment computing device 210 will utilize the common set of credentials 211 to access and utilize printing device 214 associated with computing device 206 that also contains the common set of credentials 207. Computing device 210 is able to access and utilize printing device 214 without a password or a username because of the common set of credentials 207. Computing device 210 can access and utilize printing device 214 regardless of the user or user profile associated with computing device 210 as a result of the common set of credentials 207 stored on computing device 210 and 206 respectively. Computing device 208 can also access printing device 214 because computing device 208 has the common set of credentials 207 that are the same common set of credentials 207 stored on computing device 206. Conversely, computing device 206 can access the resources of computing device 208 such as computer readable media 216 because it has the common set of credentials 207.

It will be understood and appreciated by those skilled in the art that the devices, resources, and components of the non-enterprise computer network system 200 are not limiting in number or organization on the present invention. Any and all such embodiments, and any combination thereof, are contemplated to be within the scope of embodiments of the present invention.

Figure 3:
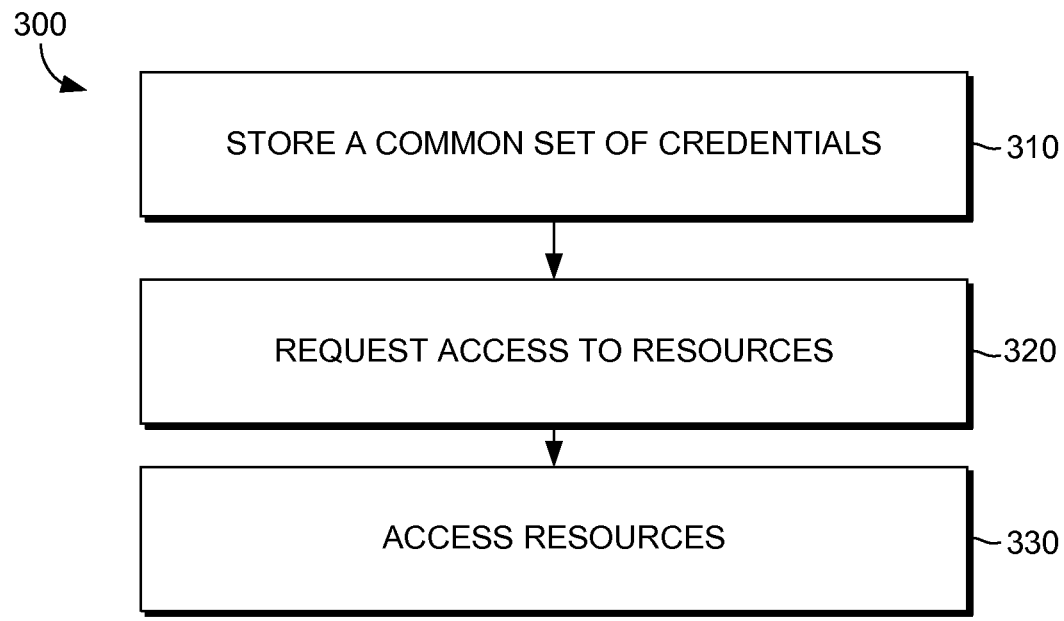
FIG. 3 is a flow diagram of an exemplary embodiment of the method for sharing resources between a plurality of computing devices associated with a common non-enterprise network, in accordance with an embodiment of the present invention.

Turning now to FIG. 3, a flow diagram illustrates an embodiment of the method 300 for sharing resources between a plurality of computing devices associated with a common non-enterprise network. At block 310, a common set of credentials are stored on a computing device associated with the non-enterprise network. In this exemplary embodiment of the present invention, the common set of credentials are stored in a local account. In an exemplary embodiment the common set of credentials are independent of the particular user of the computing device, therefore the common set of credentials are associated with a particular computing device as opposed to a particular user. When a plurality of computing devices have stored a common set of credentials and the plurality of computing devices are on a common non-enterprise network the computing devices are grouped into a homegroup as provided by an additional exemplary embodiment of the present invention.

Referring now to block 320, a computing device requests access to resources of a different computing device that is also part of the homegroup. The resources that may be requested include, but are not limited to, computer readable media, printing devices, computer storage media, and presentation devices.

Referring now to block 330, requested resources are accessed. Access is granted as a result of the requesting computing device and the granting computing device sharing a common set of credentials and both computing devices are grouped into the same homegroup. In an exemplary embodiment, access to the resources is not dependent on the use of a username or a password, instead the shared common set of credentials allows the requesting computing device to access the resources of the granting computing device.

Figure 4:
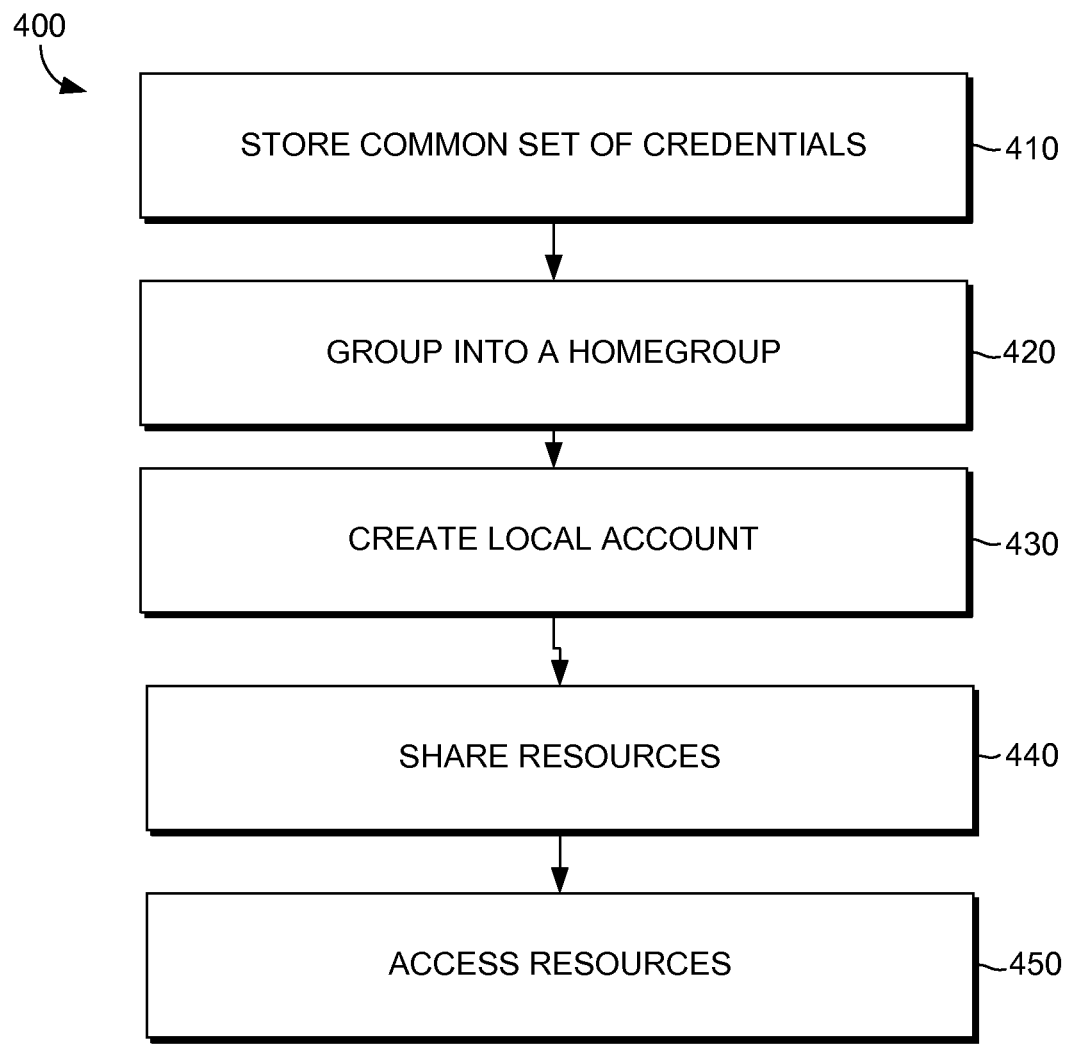
FIG. 4 is a flow diagram of an exemplary embodiment of the method for sharing resources between a plurality of computing devices associated with a common non-enterprise network, in accordance with an embodiment of the present invention.

Turning now to FIG. 4, a flow diagram illustrates an embodiment of the method 400 for sharing resources between a plurality of computing devices associated with a common non-enterprise network. Represented at block 410, a common set of credentials are stored on a computing device that is associated with a non-enterprise computer network. At block 420, all computing devices on a non-enterprise network that have stored a common set of credentials are grouped into a homegroup. At block 430, a local account is created on the computing device that stored the common set of credentials represented at block 410. The creation of a local account includes the updating of an existing local account. At block 440, the resources of the computing devices grouped in the homegroup are shared. At block 450, one or more of the resources of a computing device grouped are accessed.

Figure 5:
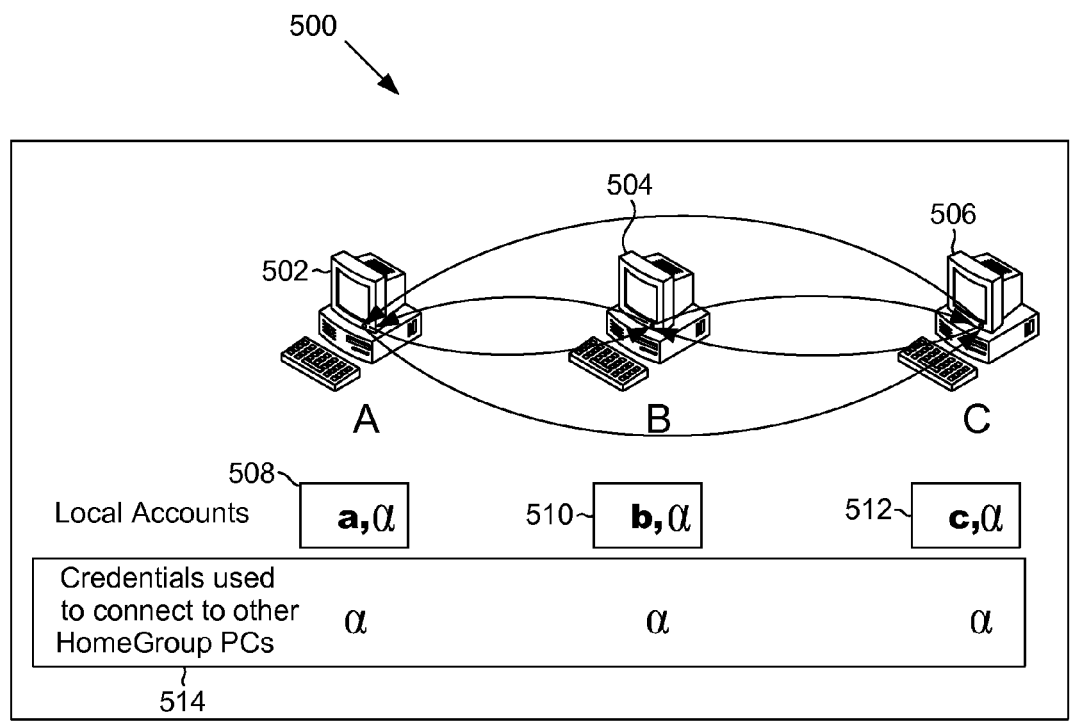
FIG. 5 is a block diagram illustrating an exemplary non-enterprise computer network system configured for use in implementing embodiments of the present invention.

Turning now to FIG. 5, a block diagram illustrates non-enterprise computer network system 500 configured for use in implementing embodiments of the present invention. The non-enterprise computer network 500 includes computing devices 502, 504, and 506 all in communication with one another. Each of the computing devices 502, 504, and 506 are associated with their own local account 508, 510, and 512 respectively. Computing device 502 has a local account 508 that contains the credentials "a" and "α", while computing device 504 has a local account 510 that contains the credentials "b" and "α". The credentials that allow the computing devices 502, 504, and 506 to communicate and share resource are the common set of credentials 514 shared between those computing devices, which in this exemplary embodiment are the "α" credentials. The other credentials contained in the local accounts 508, 510, and 512 are unique to that respective computing device. For example, local account 508 contains both "a" and "α", where the "a" credential can be a unique credential associated with computing device 502 or the user of computing device 502. Because computing device 506 has a local account 512 that contains the "α" credential, computing device 506 is able to communicate and share the resources of any other computing device on the same subnetwork that also contains the "α" credential in its local account. In this exemplary embodiment computing device 506 can share and access resources with either computing device 504 and/or computing device 502 because all three of the computing devices 502, 504, and 506 contain a common set of credentials, the "α" credentials.

In an exemplary embodiment of the present invention provides computing device 502 having a set of credentials is connected with a routing device, such as routing device 204 of FIG. 2. When computing device 504 connects to the routing device that computing device 502 is currently connected, computing device 504 requests a common set of credentials, such as the common set of credentials 207 of FIG. 2. The common set of credentials are the same common set of credentials stored on computing device 502. Computing device 504 then stores the common set of credentials in the local account 510. Because computing devices 502 and 504 both have a common set of credentials, in this example the "α" credential, in their respective local accounts 508 and 510, computing devices 502 and 504 are grouped into a homegroup. Computing devices 502 and 504 can access and share resources on or associated with the other computing device. The exemplary embodiment of the present invention also provides for computing device 502 to be disconnected from the common routing device. When computing device 506 then connects to the routing device that is also connected to computing device 504, computing device 506 request, receives and stores the common set of credentials stored on computing device 504 in local account 512 to join the homegroup that is comprised of computing device 504. Computing device 502 can then be re-connected to the routing device at which time computing device will once again request a common set of credentials to rejoin the homegroup. In an alternative exemplary embodiment of the present invention computing device 502, once re-connected, can check if it previously had requested and/or stored a common set of credentials that allows computing device 502 to join the homegroup. Because computing device 502 already contain the common set of credentials, in this case the "α" credential, it may join the homegroup without having to store the common set of credentials again.

It will be understood and appreciated by those skilled in the art that the present invention is not limited or restricted to the organization as depicted in FIG. 5. While FIG. 5 does not indicate a routing device as previously describe with respect to FIG. 2, all and every combination of networking devices, computing devices and communication protocols known or to be known that allow the implementation of the present invention have been contemplated. Computing devices 502, 504, and 506 can communicate directly to one another or a routing device such as routing device 204 of FIG. 2 may be utilized to effectuate the communication and sharing of resources among the computing devices 502, 504, and 506.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. A peer-to-peer network system, comprising:
   two or more computing devices connected to a peer-to-peer network and residing behind a routing device; and
   a common set of credentials, the common set of credentials stored with two or more computing devices grouped in a common homegroup, the common set of credentials and the common homegroup allowing for the sharing of one or more resources residing on or associated with the at least two of the two or more computing devices, wherein a first computing device of the two or more computing devices includes a first resource shareable with a second computing device and a third computing device of the two or more computing devices and a second resource that is sharable with the second computing device and is explicitly selected as non-shareable to the third computing device.

2. The peer-to-peer network of claim 1, wherein the common set of credentials are associated with each of the two or more computing devices.

3. The peer-to-peer network of claim 1, wherein the common set of credentials allow sharing of the one or more resources residing on or associated with the two or more computers without one of a user entered username, a user entered password, or combination thereof 4. The peer-to-peer network of claim 3, wherein the sharing of the one or more resources residing on or associated with the two or more computers is independent of one of a user entered username, a user entered password, or combination thereof.

5. The peer-to-peer network of claim 4, wherein the peer-topeer network is a peer-to-peer non-enterprise computer network.

6. The peer-to-peer network of claim 5, wherein the peer-to-peer network does not utilize a central server.

7. The peer-to-peer network of claim 6, wherein the one or more resources are at least one of a printing device and a computer readable media.

8. The peer-to-peer network of claim 7 wherein the one or more resources are accessible without a user selection.

9. The peer-to-peer network of claim 1, wherein the common set of credentials are stored in a local account of each of the two or more computing devices.

10. One or more computer storage media having computer-executable instructions embodied thereon that, when executed, perform a method for sharing resources between a plurality of computing devices associated with a common peer-to-peer network, the method comprising:
    receiving and storing a set of credentials, the set of credentials being common to two or more of a plurality of computing devices associated with a common peer-to-peer network and grouped in a common homegroup;
    requesting access to one or more resources, the one or more resources residing on or being associated with another computing device associated with the common peer-to-peer network, wherein a first computing device of the two or more computing devices includes a first resource shareable with a second computing device and a third computing device of the two or more computing devices and a second resource that is sharable with the second computing device and is explicitly selected as non-shareable to the third computing device; and
    accessing the one or more resources utilizing the common set of credentials and the common homegroup.

11. The method of claim 10, wherein the method further comprises creating a local account that is associated with the common credential on the two or more computing devices.

12. The method of claim 10, wherein the common set of credentials are stored on all of the plurality of computing devices associated with the peer-topeer network.

13. The method of claim 10, wherein the peer-to-peer network does not utilize a central server.

14. The method of claim 10, wherein the two or more computing devices grouped into a common homegroup utilize a peer-to-peer communication model.

15. The method of claim 10, wherein the access to the one or more resources is independent of a username and/or a password.

16. The method of claim 10, wherein the one or more resources are at least one of a printer and a computer readable media.

17. The method of claim 10, wherein the one or more resources of the plurality of computing devices is accessible without a user selection.

18. The method of claim 10, wherein requesting access to one or more resources is presenting the common set of credentials to another computing device associated with the common peer-to-peer network.

19. The method of claim 11, wherein the creation of local account that is associated with the common credential on the two or more computing devices includes updating of an existing local account.

20. One or more computer storage media having computerexecutable instructions embodied thereon that, when executed, perform a method for sharing resources between a plurality of computing devices associated with a common peer-to-peer network, the method comprising:
    storing a common set of credentials on two or more of the plurality of computing devices associated with the common peer-to-peer network, wherein the common peer-to-peer network does not contain a central server;
    grouping the two or more of the plurality of computing devices into a common homegroup, wherein the two or more of the plurality of computing devices grouped into a common homegroup utilize a peer-to-peer communication model;

creating a local account on each of the two or more of the plurality of computing devices within the homegroup, wherein the local account contains the stored common set of credentials;

sharing access to one or more resources, wherein the one or more resources reside on or are associated with at least one of the computing devices within the common homegroup, further wherein the one or more resources is comprised of a printer and a computer readable media; and allowing access to the one or more resources of the two or more of the plurality of computing devices grouped into the common homegroup utilizing the common set of credentials, wherein the access to the one or more resources is independent of a user entered username or a password, wherein a first computing device of the two or more of the plurality computing devices includes a first resource shareable with a second computing device and a third computing device of the two or more computing devices and a second resource that is sharable with the second computing device and is explicitly selected as non-shareable to the third computing device.

* * * * *